US009357618B2

(12) United States Patent
Pandharipande et al.

(10) Patent No.: US 9,357,618 B2
(45) Date of Patent: May 31, 2016

(54) DEVICE AND METHOD FOR ILLUMINATION CONTROL OF A PLURALITY OF LIGHT SOURCES

(75) Inventors: Ashish Vijay Pandharipande, Eindhoven (NL); Sri Andari Husen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 176 days.

(21) Appl. No.: 14/007,994

(22) PCT Filed: Apr. 2, 2012

(86) PCT No.: PCT/IB2012/051599
§ 371 (c)(1),
(2), (4) Date: Sep. 27, 2013

(87) PCT Pub. No.: WO2012/137125
PCT Pub. Date: Oct. 11, 2012

(65) Prior Publication Data
US 2014/0015418 A1    Jan. 16, 2014

(30) Foreign Application Priority Data

Apr. 4, 2011    (EP) .................................... 11161051

(51) Int. Cl.
*H05B 37/02*    (2006.01)

(52) U.S. Cl.
CPC ........ *H05B 37/0218* (2013.01); *H05B 37/0272* (2013.01); *Y02B 20/46* (2013.01)

(58) Field of Classification Search
CPC ............ H05B 37/0218; H05B 33/0869; F21V 23/0442
USPC .......... 315/152, 291, 292, 158, 149; 700/276, 700/3, 275, 286, 278
See application file for complete search history.

(56) References Cited

U.S. PATENT DOCUMENTS 7,747,357 B2    6/2010 Murdoch
(Continued)

FOREIGN PATENT DOCUMENTS

| WO | 2008000086 A1 | 1/2008 |
| WO | 2010010491 A2 | 1/2010 |
| WO | 2011014657 A1 | 2/2011 |

OTHER PUBLICATIONS

Joe A. Short et al; "Stabilization of Grid Frequency Through Dynamic Demand Control", IEEE Transactions on Power Systems, vol. 22, No. 3, Aug. 2007, pp. 1284-1293.
(Continued)

*Primary Examiner* — Lincoln Donovan
*Assistant Examiner* — Thomas Skibinski
(74) *Attorney, Agent, or Firm* — Meenakshy Chakravorty

(57) ABSTRACT

The invention is based on the idea that a lighting system can utilize its sensing and control functionalities to offer dynamic load management (e.g. demand response) services in an electrical grid. The present invention optimizes dimming levels of lighting sources of a lighting system by determining a solution for an optimization problem directed to determining new dimming levels such that power consumption of the lighting devices is reduced. During the determining the solution for the optimization problem, the present invention may take into account specific guarantees on illumination rendering, acceptable to different users, and differing illumination requirements in different spaces or rooms. By the lighting control of the present invention, predictable and effective load reductions may be achieved.

15 Claims, 5 Drawing Sheets

(56) References Cited

U.S. PATENT DOCUMENTS

| | | |
|---|---|---|
| 2005/0110416 A1 | 5/2005 | Veskovic |
| 2010/0117620 A1 | 5/2010 | Veskovic et al. |
| 2010/0138363 A1 | 6/2010 | Batterberry et al. |
| 2010/0262296 A1 | 10/2010 | Davis et al. |
| 2010/0262297 A1 | 10/2010 | Shloush et al. |
| 2010/0286937 A1 | 11/2010 | Hedley et al. |
| 2011/0035061 A1* | 2/2011 | Altonen et al. ............... 700/278 |

OTHER PUBLICATIONS

"Project 3.2 Energy Efficient Load-Shedding Lighting Technology" Lighting Research Program, California Energy Commission, Oct. 2005, CEC-500-2005-141-16.

Ali Ipakchi et al; "Grid of the Future", IEEE Power & Energy Magazine, 2009 IEEE, pp. 52-62.

"Commercial Buildings Energy Consumption Surver", 2003, pp. 1-6. www.eia.doe.gov/emeu/cbecs/cbecs2003/detailed_tables_2003/detailed_tables_2003.

* cited by examiner

DEVICE AND METHOD FOR ILLUMINATION CONTROL OF A PLURALITY OF LIGHT SOURCES

FIELD OF THE INVENTION

The invention relates to a device configured to set (new) dimming levels of a plurality of light sources (or lighting sources) and to a method for setting (new) dimming levels of a plurality of light sources. Additionally, the present invention relates to a lighting system comprising said device.

BACKGROUND

Lighting systems are known to consume a large proportion of energy in buildings and more generally in city infrastructures, see, for example, Energy Information Administration, "Commercial Buildings Energy Consumption Survey," 2003. As known, an intensive operating of the lighting systems leads to a high consumption of energy. Moreover, as new energy consumers such as electric vehicles become prevalent, patterns of energy consumption become more dynamic, which, in turn, leads to necessitating load management more often in time. Further, electricity generation will become more dynamic, as, recently, renewable energy sources are integrated into electricity grids. These trends result in multiple short-duration peaks and off-peaks of electricity demands and/or consumption. Thus, in future grids, dynamic load management will become increasingly challenging and critical. As known, the dynamic load management comprises, for example, techniques like dynamic demand and demand response; see for a more concrete explanation, for example, J. A. Short, D. G. Infield and L. L. Freris, "Stabilization of grid frequency through dynamic demand control," IEEE Transactions on Power Systems, pp. 1284-1293, 2007 and/or A. Ipakchi and F. Albuyeh, "Grid of the future," IEEE Power and Energy Magazine, pp. 52-62, 2009.

Dynamic demand involves passive shutting of devices to handle stress situations in the grid. Demand response, in turn, involves an explicit request to consumers to shut off devices. In either case, mechanisms for dynamic demand and demand response need to balance energy consumption to cater to dynamic variations in electricity generation/provision.

Electrical utility companies have been faced with a number of technical challenges in realizing load balancing and encouraging consumers to shed or shift load during periods of peak demand. Recently, a number of technologies have been developed with regard to sensing and monitoring, control and connectivity for enabling a greater flexibility in energy consumption across the grid. Thus, dynamic load management techniques like demand response or dynamic demand, for example, are the most commonly used techniques in electricity grids.

Lighting systems are attractive as controllable loads to enable dynamic load management. In lighting systems with controllable loads load reductions can be performed in a more predictable and substantial way. In general, lighting control systems are known and have been described in the literature.

For example, Lighting Research Program: Project 3.2 Energy Efficient Load-Shedding Lighting Technology Final Report, California Energy Commission Public Interest Energy Research Program, October 2005, CEC-500-2005-141-A6, describes that lamps or lighting devices are dimmed using load-shedding ballasts by a certain amount over a duration of time. The load-shedding ballast enables the lighting system to provide cost-effective electrical demand response. According to said publication, all lamps are dimmed under a load-shedding request and the approach is based on preset values and provides a static open loop control solution. However, such a solution can be acceptable to occupants for short time durations and small amounts of dimming. Longer durations of low dimming would, however, affect occupant comfort and productivity, as the user is not in the control loop. Furthermore, the solution may not be acceptable to all users, who may have different illumination requirements to the lighting system.

In U.S. Pat. No. 7,747,357 B2, for example, communication methods for transmitting and receiving load shedding messages are described. US 2010/0117620 A1, in turn, describes methods for automatically reducing power consumption based on load shedding requirements and set thresholds.

Although different lighting control methods are known, there is a need for new devices, methods and/or systems for smart lighting control.

SUMMARY OF THE INVENTION

It is an object of the present invention to provide a methodology improving the control of lighting systems.

It is also an object of the present invention to provide devices, methods and/or systems for smart lighting control by which dynamic load management (e.g. demand response) services may be offered in a predictable and effective way in a smart grid. Further, it would be advantageous to achieve devices, methods and/or systems that incorporate guarantees on the quality of illumination rendering that may be specific to individuals or room environments.

The object is achieved by the features of the independent claims.

The invention makes use of an understanding that a lighting system can utilize its sensing and control functionalities to offer dynamic load management (e.g. demand response) services in an electrical grid. The present invention optimizes dimming levels of lighting sources of a lighting system by determining a solution for an optimization problem directed to determining new dimming levels such that power consumption of the lighting devices is reduced. During the determining the solution for the optimization problem, the present invention may take into account specific guarantees on illumination rendering, acceptable to different users, and differing illumination requirements in different spaces or rooms. By the lighting control of the present invention, predictable and effective load reductions may be achieved.

The dimming levels of individual dimmable luminaires or light sources, respectively, may be set in response to a demand response signal or predictively for load balancing, e.g. based on (perturbing) values measured from sensors (e.g. daylight sensor, presence sensor etc.) and/or (perturbing) settings of other controllers (e.g. blind controller). When using perturbations, they may be chosen so as to balance power reduction by required amounts and illumination/visual comfort. The perturbations may be chosen differently across different lighting controllers.

In one aspect of the present invention, a lighting controller configured to set dimming levels of a plurality of light sources arranged to, at least partly, provide a spatial illumination at a workspace. The lighting controller comprises a processor arranged to determine, based on information about a target power level or target power reduction, a dimming level for each of the plurality of light sources such as to reduce power consumption from the plurality of light sources towards the target power level or target power reduction and such as to provide a target spatial illumination at the workspace.

The term "workspace" should, in the context of the present specification, be understood as an area or group of areas which the light sources may illuminate. Examples of a workspace may be a writing desk in a room, a room itself or even an entire building floor comprising several rooms or compartments.

A dimmed light source illuminates at a lower degree than a light source being turned on but not dimmed. Consequently, the term "dimming level" should, in the context of the present specification, be understood as a level representing a percentage of the maximum power of an undimmed light. A low dimming level means that the light source is illuminating at a lower degree then if the light source is illuminating at a high dimming level.

An advantage of determining the dimming level of the light sources by reducing the power consumption for the light sources towards e.g. a target power level and by providing a target spatial illumination at the workspace is that energy consumption is reduced while, at the same time, illumination is provided to the workspace as per the comfort levels, security and/or illumination desired in the workspace (like e.g. by users or persons). Thus, the dimming level of a certain light source may be determined as to balance the power reduction of the light source by the target spatial illumination of the workspace influenced by the light source.

In one embodiment of the present invention, the processor may be configured to obtain the information about a target power level or target power reduction from a request for reduction of power consumption of the plurality of light sources or predictively for load balancing. In a further embodiment of the present invention, the lighting controller may further comprise a transmitter arranged to transmit the respective determined dimming level to each of the plurality of light sources.

By the term "predictively for load balancing" should, in the context of the present specification, be understood that the controller may be configured to pre-compute what power consumption savings may be achieved if new dimming levels were applied and proactively advertise this for load balancing purposes.

An advantage of the present embodiment is that the lighting control system is adapted to set dimming levels of individual dimmable luminaries in response to e.g. a demand response signal, thereby providing a more dynamic load management.

According to yet another embodiment of the present invention, the lighting controller may further comprise a receiver arranged to receive at least one of peripheral data from a daylight sensor regarding ambient illumination at the workspace, peripheral data from a blind controller regarding a blind setting, the blind controller being arranged to control ambient illumination at the workspace, and peripheral data regarding a degree of occupancy in the workspace from a presence sensor.

With such peripheral data, the lighting controller may set dimming levels in a more effective way by considering other data than the target power levels (or target power reduction) and the target spatial illumination. These peripheral data may be specific to each light source controlled by the lighting controller or to room environments and/or objects or individuals present in the areas to be illuminated by the light sources.

In one embodiment of the present invention, the target spatial illumination in the workspace may be determined by a service policy with a guarantee on illumination rendering and limit thereof.

Such a service policy could differ across illumination function type (e.g., different for decorative lighting and general lighting). Such a service policy could be global (e.g. an entire floor or building), local (e.g. a room) or individual according to user preferences based for instance on their visual comfort levels.

In a further embodiment of the present invention, the service policy with a guarantee on illumination rendering may comprise at least one of: an illumination level for an occupied region of the workspace, an illumination level for an unoccupied region of the workspace and a range defining the occupied region around an occupant location in the workspace.

An effect of this feature may be that the illumination requirements may vary depending on the occupancy of a region. Thus, the dimming level of a light source arranged to illuminate such a region may vary depending on the state of occupancy in the region. An advantage of the present embodiment is that a lower dimming level may be transmitted to a light source arranged to illuminate an unoccupied region, thereby further reducing the power consumed by the light source. Similarly, a higher dimming level (or at least an adequate dimming level with respect to the target spatial illumination) is transmitted to a light source arranged to illuminate an occupied region of the workspace. In other words, a smarter controller is provided. Further, the target power reduction may be reached without dimming a light source arranged to illuminate an occupied region to the same extent. Thus, both the target spatial illumination at the workspace in an occupied region may be provided and target power level of the plurality of light sources may be reached.

According to another embodiment of the present invention, the service policy with a guarantee on illumination rendering is tunable (or selectable), which renders the light controller more flexible for changing or setting the illumination requirements of the workspace. The tuning may be performed instantaneously by a person at a writing desk illuminated by one or several of the light sources or in any other suitable way. The tuning may be performed manually, according to a predetermined scheduling, at the controller or remotely via any suitable kind of control data transmission.

According to an embodiment of the present invention, the processor may be arranged to determine the dimming level of the light sources considering peripheral data regarding a degree of occupancy in the workspace, peripheral data regarding a blind setting and/or peripheral data regarding ambient illumination at the workspace.

If, for example, the ambient illumination at a region being illuminated by a light source is substantial (e.g. the region is situated near a window where the sun is shining in), the dimming level of this light source may be set to be low without reaching the lower limit of the required illumination at the workspace of the region (i.e. still satisfying the targets spatial illumination). If, for example, the blind setting of a blind close to a region being illuminated by a light source is set to closed, the lighting controller of the present invention may control (or send information to) the blind controller in order to open up the blinds such that the ambient light in the region is increased, thereby allowing the dimming level of the light source to be lower than if the blinds were still closed. Thus, the power level set to the light source by the lighting controller may be reduced.

According to another embodiment of the present invention, the processor may be further arranged to determine the dimming levels for each of the plurality of light sources by applying perturbation to at least one of the following data: the target spatial illumination, an ambient illumination at the workspace, data from a blind controller regarding a blind setting for controlling ambient illumination at the workspace and a contrast threshold representative of a tolerable deviation of the spatial illumination from the target spatial illumination.

Under a given lighting control strategy, the luminaires are at a certain dimming level corresponding to a particular power consumption. If, for example, a dynamic demand/demand response signal sets in or is received, the lighting controller may determine a new dimming level (or new dimming levels) for the luminaires by applying perturbations to sensor readings and/or other control system settings such that the new dimming levels are within the illumination guarantees (i.e. corresponds to the target spatial illumination) and if feasible results in a power consumption meeting the required power reduction. Perturbations may be made on the sensor data received by the lighting controller. For example, the daylight input is increased a bit over the actual value. Alternatively, or in addition, the desired spatial illumination may be decreased by a certain amount and/or the tolerable limits may be increased. Such a perturbation may result in a more relaxed optimization problem, thereby resulting in lower dimming levels of the light sources. The lower dimming levels may result in an enhanced power reduction, in particular higher than that obtained by solving the optimization problem without any perturbation.

According to another embodiment of the present invention, the processor is further arranged to determine a dimming level for each of the plurality of light sources by selecting data from the at least one of the above mentioned data sequentially and applying perturbation to the selected data in increasing step.

It will be appreciated that different options in selecting the perturbation values may be adopted. The perturbations may be selected sequentially and applied in increasing steps till the required power reduction is achieved or the tolerable limits of illumination guarantees are reached. Alternatively, the perturbations may themselves be optimization variables of the optimization problem. In this case, the lighting controller may determine the optimum dimming levels as well as the perturbations to be applied as part of the optimization procedure such that the power consumption is reduced as desired, under the guaranteed illumination to be rendered in the workspace.

According to an embodiment of the present invention, the perturbation may be a positive value such that the perturbation direction of a value being perturbed is fixed.

An effect of this may be that the perturbations are predictable to some extent. The daylight input, for example, can only be increased a bit over the actual value, but never decreased. An decreased daylight input would result in higher dimming levels and thereby a smaller power reduction, which is not desirable.

According to a further embodiment of the present invention, the daylight sensor and/or the presence sensor may be arranged to provide data at various levels of detail relative to the workspace.

An advantage of the present embodiment may be that a more flexible controller for determining dimming levels is provided. A presence sensor is capable of determining occupancy e.g. in an office. The presence sensor may be able to determine occupancy at various levels of detail, e.g. at a coarse room level or at a finer location level, depending on the demands on the controller or system in which the controller is arranged to operate. For example, during night time, it may be sufficient to only determine occupancy at a coarse room level.

According to a second aspect of the present invention, a lighting system is provided. The lighting system comprises at least one light source and a lighting controller according to any one of the preceding embodiments.

According to an embodiment of the present invention, the lighting system may further comprise at least one of a daylight sensor, a presence sensor and a blind controller.

According to a third aspect of the present invention, a method for setting dimming levels of a plurality of light sources arranged to, at least partly, provide a spatial illumination at a workspace, is provided. The method comprises the step of determining, based on information about a target power level or target power reduction, a dimming level for each of the plurality of light sources such as to reduce power consumption from the plurality of light sources towards the target power level or target power reduction and such as to provide a target spatial illumination at the workspace.

The second and third aspect may generally have the same features and advantages as the first aspect.

In other terms, according to one embodiment of the present invention, a device is provided, which is configured to set new dimming levels of a plurality of lighting sources by determining a solution for an optimization problem in response to a request for reduction of power consumption of the plurality of lighting sources or predictively for load balancing (i.e., when a demand for reduction of power consumption has been detected), where for each lighting source of the plurality of lighting sources a new dimming level is determined such that power consumption of the plurality of lighting sources is reduced by the new dimming levels of the plurality of lighting sources, wherein the device is configured to determine the solution for the optimization problem by use of perturbing values and to calculate the perturbing values by applying perturbations to data, which has been determined, set and/or provided with regard to the plurality of lighting sources and which has been selected for the applying the perturbations. The term and general mechanism of "optimization problem" is known and represents a problem of determining a best solution from all feasible solutions. In line with the present embodiment, the optimization problem mechanism may be implemented for controlling a lighting system and, particularly, the lighting sources of the lighting system, wherein aspects like detecting appropriate or optimal dimming levels and reducing power consumption may be handled such that an optimal adjusting of the dimming levels and power consumption of the lighting sources is achieved. In this way, a more effective and predictable load reduction is achieved, which is applicable in smart grids. Further, it is ensured that guarantees on the quality of illumination rendering, which may be specific with regard to requirements of rooms and/or users or individuals, are taken into consideration. Furthermore, it is achieved that dimming levels or lighting sources of a lighting system are determined optimally and effectively based on actually required levels of power consumption reduction and/or on actually required duration for the power consumption reduction. The present embodiment allows use of different duration settings, i.e., the power consumption may be reduced for both very short and long time periods, which may start with some seconds and end in the area of several days, months etc, for example. Thus, the present invention allows a flexible adjusting of dimming levels and of power consumption requirements of plurality of lighting sources. Further, the present invention takes into consideration each lighting source individually and performs an individual adjusting with regard to each of the lighting sources. In this way, an adjusting of high quality is ensured with regard to requirements and/or settings of the lighting system.

As specified, the new dimming levels may be set in response to a request for reduction of power consumption of the plurality of lighting sources or predictively for load balancing. Here, the request may be, for example, a dynamic load management signaling request, as implemented in the dynamic response technique of the dynamic load management, for example. Setting the new dimming levels predictively for load balancing (i.e., when a demand for reduction of power consumption has been detected) may be used, for example, within the scope of the dynamic demand technique of the dynamic load management. Here, the power consumption is monitored for balancing the power generated/delivered and the consumed power and, if it is determined or predicted that the amount of power generated/delivered is/becomes/will become smaller than the consumed power, the power reduction (as implemented by the present invention) has to be performed. Thus, the present invention is applicable with regard to several technologies of the dynamic load management like the dynamic response and/or the dynamic demand technique, for example.

The term "perturbing values" means that, instead of exactly provided, determined or set values, approximated values (or perturbing values, respectively) are used, which deviate from the exactly provided, determined or set values by a (small) parameter $\epsilon$. Thus, when perturbations are applied, the exact values are approximated or perturbed by making them smaller or larger by use of the (small) parameter $\epsilon$. In general, the technique of applying perturbations and the term "perturbing values" is known from the area of perturbation theory.

Additionally, it has to be noted that the device may comprise a software and/or hardware component (e.g. a processor, computer, computing component in general etc.), which is configured to perform the setting of new dimming levels according to the present embodiment, particularly, the determining of the solution for the optimization problem. According to an embodiment of the present invention, the software and/or hardware component is referred to as optimizer or a processor.

According to another embodiment of the present invention, the processor may be further arranged to determine a dimming level using current dimming levels of each of the plurality of light sources.

In other words, the current dimming levels of the plurality of lighting sources are variables of the optimization problem, each lighting source of the plurality of lighting sources having one current dimming level. In this way, an optimal adjusting of the dimming levels and of power consumption is achieved by taking into consideration the requirements and settings of the lighting system.

According to another embodiment of the present invention, the dimming level may be represented by a value between 0 and 1, wherein a value of 0 corresponds to the light source being turned off and a value of 1 corresponds to the light source being turned on at 100% of its power. This constrain may be advantageously employed when solving the optimization problem that results in new dimming levels for the light sources.

In other words, the dimming levels are values being larger or equal to zero and being smaller or equal to one. Thus, a controlled and effective adjusting of the dimming levels and of the power consumption is achieved.

According to yet another embodiment of the present invention, the processor may be arranged to determine the dimming levels for the light sources such that a variation between a spatial illumination achieved at the workspace and the target spatial illumination is less than a contrast threshold value.

The contrast threshold value may represent a tolerable deviation of the spatial illumination from the target spatial illumination. With such a threshold value, a limit for how much lower the spatial illumination may be varied as compared to the target spatial illumination is determined. The contrast threshold value may also vary depending on the properties of the region being illuminated. An unoccupied region may, for example, have a higher contrast threshold value than an occupied region. For example, a region with a writing desk may have a lower contrast threshold value than a region (only) comprising decorative lighting.

In other words, the device is configured to determine the solution for the optimization problem such that a variation of a current spatial illumination from a target spatial illumination is less than a tolerable contrast threshold value, wherein the current spatial illumination is achieved by current dimming levels of the plurality of lighting sources. This enables a good control of adjusting of the dimming levels and of the power consumption and ensures an effective execution of said adjusting.

According to an embodiment of the present invention, the device is configured to determine for each lighting source of the plurality of lighting sources the new dimming level by use of at least one information, the at least one information being determined and/or set with regard to the respective lighting source. In this way, an effective way of taking into consideration information of environments of the lighting sources, of rooms comprising the lighting sources and/or of lighting requirements, for example, is enabled.

According to an embodiment of the present invention, the current spatial illumination, which is achieved or obtained by the current dimming levels of the plurality of lighting sources, is further achieved or obtained by the at least one information determined and/or set with regard to each lighting source of the plurality of lighting sources. Herewith, the quality of the new dimming levels determined may be improved by considering factors influencing, affecting and/or causing the value of the current spatial illumination and, hence, also the value of the target spatial illumination. The new dimming levels may be set by taking into consideration requirements of rooms and/or users or individuals in an efficient and effective way.

According to an embodiment of the present invention, the data to which the perturbations are applied, comprises at least one of the following: at least one of the at least one information determined and/or set with regard to each lighting source of the plurality of lighting sources; the target spatial illumination; the tolerable contrast threshold value. Thus, a more relaxed optimization method can be implemented that may result in lower dimming levels of the lighting sources.

According to an embodiment of the present invention, the at least one information comprises sensor data and/or data determined or set by a further device with regard to lighting sources. In this way, guarantees on the quality of illumination rendering, that may be specific to individuals and/or room environments, are incorporated in an effective and efficient way.

According to an embodiment of the present invention, the at least one information comprises at least one of the following: a value indicating a degree of occupancy determined by a presence sensor; a value indicating a daylight level determined by a daylight sensor; a blind setting of a blind controller. Here, also further values determined or set by further sensors or devices may be taken into consideration. Thus, it is ensured that guarantees on the quality of illumination rendering, that may be specific to individuals and/or room environments, are incorporated or considered in an effective and efficient way.

According to an embodiment of the present invention, while determining the solution for the optimization problem, the device is configured to reduce the power consumption of the plurality of lighting sources up to a target power consumption. In this way a selective or targeted setting of new dimming levels is enabled, wherein it is ensured that the lighting devices will be operated with an actually desired power consumption. Further, an effective and targeted balancing of power generation/provision and power consumption is enabled.

According to yet another embodiment of the present invention, the information about a power level or a power reduction may be a request including a period of time, the processor being further arranged to maintain the determined dimming levels for each of the plurality of light sources during the period of time.

In other words, the device is configured to reduce the power consumption for a period of time. In this way, both a temporal and a long time power reduction are enabled. Further, efficient and well controllable power consumption becomes possible.

According to a further embodiment of the present invention, the request comprises at least one of the following: the target power consumption; the period of time. In this way, a controllable dynamic load management can be implemented in an efficient and effective way.

According to a further embodiment of the present invention, at least one of the plurality of lighting sources may be a light emitting diode (LED). With advances in LED technologies, LED lighting systems become common place. LED lighting systems offer multiple degrees of freedom in design, e.g. in dimming individual LEDs in the system. The present embodiment ensures that also lighting systems, which comprise LEDs, may benefit from the improved lighting system control of the present invention and may comprise the effects of the present invention. Thus, it is enabled that individual LED dimming levels adapted to associated sensing and control information may be detected in real-time so as to offer dynamic load management (e.g., demand response) services in a smart grid, while meeting acceptable illumination service guarantees to users.

According to a further embodiment of the present invention, the device is configured to: apply the perturbations sequentially, incrementally and/or in combination; apply the perturbations based on previously applied perturbations, which have been applied with regard to a previous power consumption reduction; apply the perturbations based on the previously applied perturbations by use of previous data, which has been selected for appliance of the previously applied perturbations; and/or apply the perturbations based on previously applied perturbations by use of values of the previously applied perturbations. In this way, a flexible appliance of perturbations may be performed. Further, the quality of determining new dimming levels is improved towards the actual requirements of the lighting system and/or the users of the lighting system, particularly, by taking into consideration the already used parameters, values, information and/or data, probably, well established or experienced with regard to power consumption reduction in the lighting system.

In one embodiment of the present invention, a method is provided, which is configured for setting new dimming levels of a plurality of lighting sources by determining a solution for an optimization problem in response to a request for reduction of power consumption of the plurality of lighting sources or predictively for load balancing (i.e., when a demand for reduction of power consumption has been detected), where for each lighting source of the plurality of lighting sources a new dimming level is determined such that power consumption of the plurality of lighting sources is reduced by the new dimming levels of the plurality of lighting sources, wherein the solution for the optimization problem is determined by use of perturbing values and wherein the perturbing values are calculated by applying perturbations to data, which has been determined, set and/or provided with regard to the plurality of lighting sources and which has been selected for the applying the perturbations. Particularly, said method comprises steps performed by the device for setting new dimming levels as outlined above and described in more detail below. Thus, the method is performed by said device. In this way, the method and it steps provide the same effects as described with regard to the device for setting new dimming levels and vice versa.

In a further embodiment of the present invention, a (lighting) system is provided, which comprises the device configured for setting new dimming levels as outlined above and described in more detail below.

Generally, the present invention allows implementing a (smarter) lighting control, by which dynamic load management (e.g. demand response) services may be offered in a predictable and effective way (particularly, in smart grids) and which also allows incorporating guarantees on the quality of illumination rendering that may be specific to individuals or room environments. Further, a faster control of lighting systems, particularly, a faster setting new dimming levels is enabled in view of required power consumption, wherein a real-time implementation of the present invention is possible. Particularly, the present invention improves control of lighting sources, of lighting systems, as indicated by the effects of the present invention described in the present disclosure of the invention.

Other objectives, features and advantages of the present invention will appear from the following detailed disclosure as well as from the drawings.

Generally, all terms used in the claims are to be interpreted according to their ordinary meaning in the technical field unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

Figure 1:
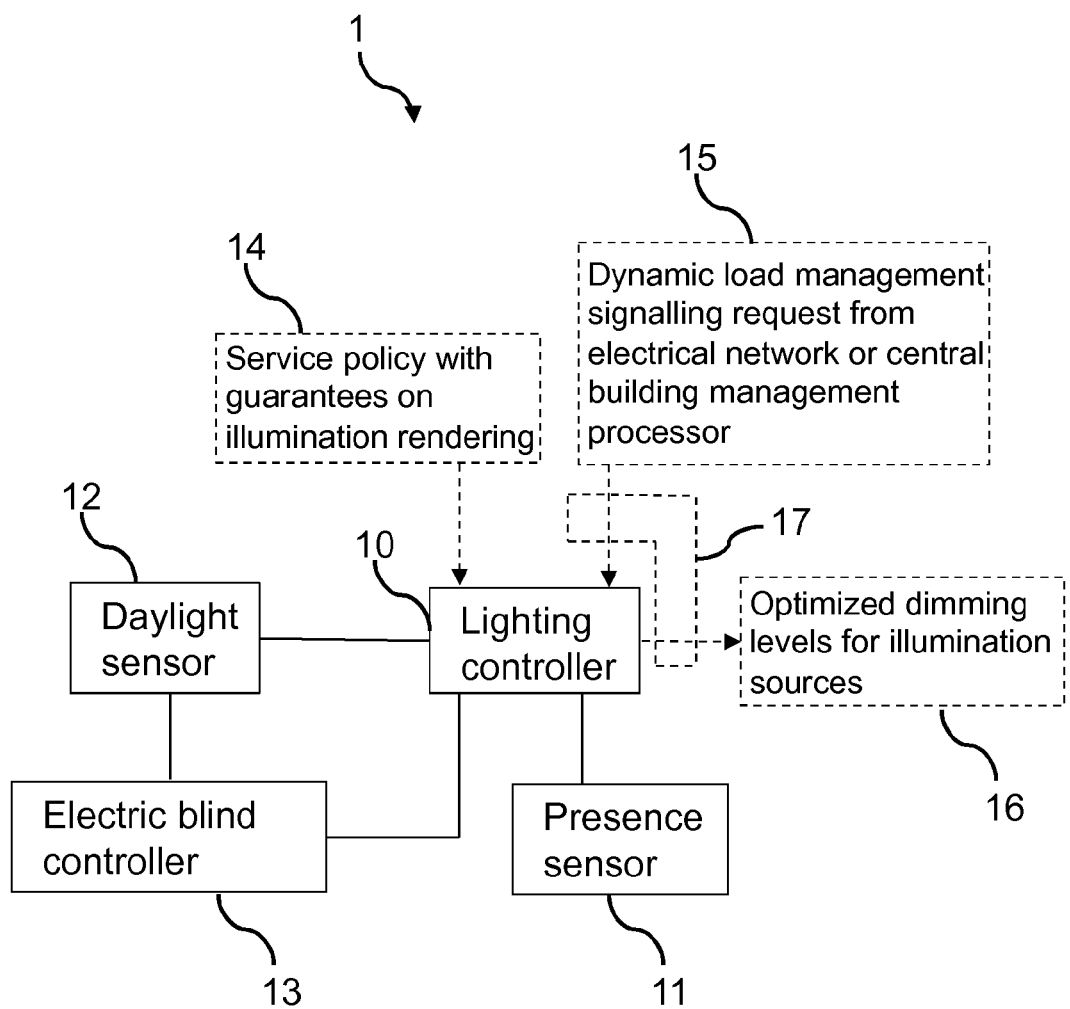
FIG. 1 illustrates a view on an arrangement of a lighting system according to an embodiment of the present invention.

FIG. 1 illustrates a view on an arrangement of a lighting system 1 according to an embodiment of the present invention. In line with the present embodiment, the lighting system 1 comprises a lighting controller 10 configured to control lighting sources like lamps or LEDs (light-emitting diodes), for example, and particularly configured to control power consumption and, thus, also dimming levels of the lighting sources, for example. A lighting system 1 may, in addition to luminaires, comprise sensors 11, 12 (presence, light, etc) and be connected to other sub-systems such as blind controllers 13 and associated sensors. For achieving a desired lighting effect, the design variables (for e.g., the dimming levels of luminaires) of the lighting system may be optimized. For example, to obtain localized illumination, a strategy of having a higher level of uniform illuminance in a region surrounding occupant locations and a lower illuminance level in other regions may be implemented. The region surrounding an occupant may be modeled to be circular with a radius r, the occupant being at the origin of the circle. The control strategy may be posed analytically as an optimization problem in order to derive the dimming levels of the luminaires. Methods to solve the resulting optimization problems, which often are linear or convex programs (and sometimes non-linear), may be found in *Linear and non-linear programming* (by Luenberger and Ye, Springer, 2008).

According to the present embodiment, the system 1 may equipped with different sensors 11, 12, 13. In line with the present embodiment, three sensors are provided, e.g., a presence sensor 11, a daylight sensor 12 and an electric blind controller 13. Here, it will be appreciated, that different appropriate sensors, which are configured for providing values relevant for determining lighting and/or power consumption levels, may be used according to the present embodiment in the lighting system 1.

The presence sensor 11 is configured to determine occupancy in an office or room in general, said office or room comprising lighting sources of the lighting system 1. The presence sensor 11 may be able to determine occupancy at various levels of detail, e.g. at a coarse room level, or at a finer location level. In line with the present embodiment, the presence sensor 11 provides as input to the lighting controller 10 a vector p, which comprises values $p_i$ indicating a degree of occupancy with regard to (near or around, for example) an i-th lighting source ($1 \leq i \leq I$) of the lighting system.

A daylight sensor 12 is capable of determining the daylight level across the room, possibly at different levels of detail, e.g. as an average value or as a spatial distribution. The output, that the daylight sensor 12 provides as input to the lighting controller 10, is denoted as vector d, which comprises values $d_i$ indicating a daylight level with regard to (near or around, for example) an i-th lighting source ($1 \leq i \leq I$) of the lighting system.

Further, according to the present embodiment, a blind controller 13 is associated with the daylight sensor 12. The blind controller 13 provides a vector b as input to the lighting controller 10, which comprises values $b_i$ indicating a blind setting of the blind controller 13 with regard to (near or around, for example) an i-th lighting source ($1 \leq i \leq I$) of the lighting system.

Here, it has to be noted that the present invention allows different connections and communications of data between the lighting controller 10 and the sensors 11, 12, 13 and that the present invention is not limited to the sensors and/or connections between the lighting controller and the sensors of the embodiment of FIG. 1 only.

The lighting system 1 in different rooms may directly interface with an electrical network (for e.g., from the utility meter by wired or wireless means) or with a central building management processor (that interfaces with the electrical network), for example. According to the present embodiment, an interface 17 is placed between the lighting controller 10 and the electrical network or the central building management processor. The interface 17 (or the electrical network or the central building management processor, respectively) may provide target power reductions and/or requested time durations for the target power reductions in dynamic load management signaling requests. These requests can, for example, be different for different rooms, with the amounts distributed depending on the measurements of the sensors 11, 12, 13, i.e. depending on vectors p, d and/or b. In FIG. 1, the dynamic load management signaling requests transmitted from the electrical network or from the central building management processor, for example, (via the interface 17) to the lighting controller 10 for requesting power consumption reduction in the lighting system 1 are illustrated exemplary by the information or data box 15. After receiving a request, in line with the present embodiment, the lighting controller 10 is configured to optimize the dimming levels of the illumination sources of the system 1, as outlined above and described in more detail below, and to transmit the optimized dimming levels 16 for illumination sources of the system 1 to the electrical network or to the central building management processor, for example, (via the interface 17). Further, in line with the present embodiment, the lighting system 1 may have information regarding service policies and/or requirements 14. These include illumination rendering guarantees, that may be set by users as per their comfort levels. The service policy may further include information on lighting function types. Here, it has to be pointed out that several appropriate ways of communicating between an electrical network or a central building management processor, for example, and the lighting controller 10 may be implemented. The use of the interface 17 is one of the possible ways.

Figure 2:
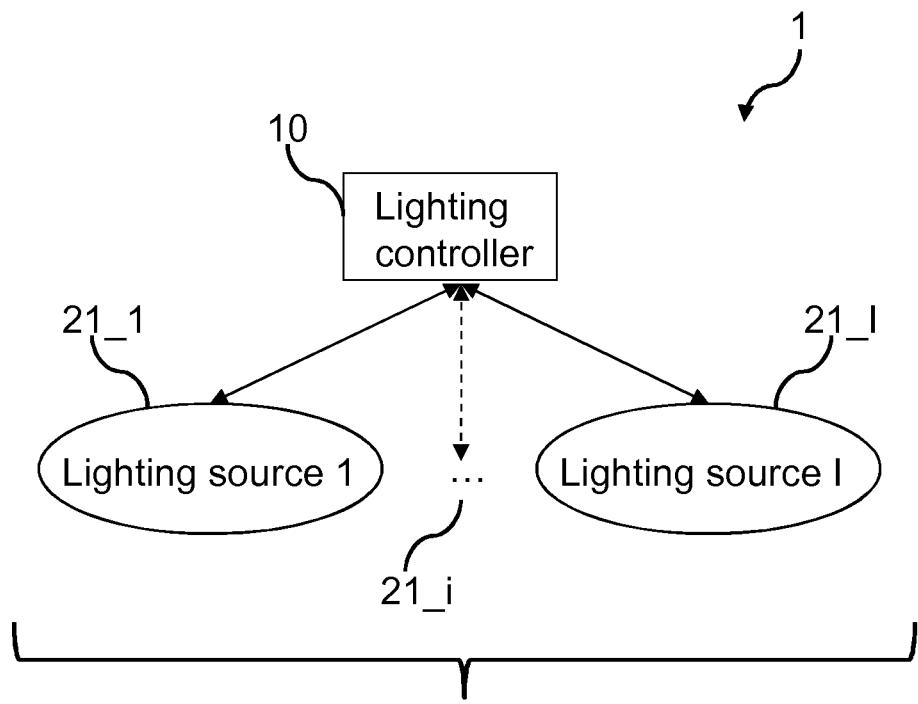
FIG. 2 illustrates a further view on the arrangement of the lighting system according to the embodiment of the present invention.

FIG. 2 illustrates a further view on the arrangement of the lighting system 1 according to the embodiment of the present invention. In FIG. 2, the multiple dimmable illumination sources 21_1, ..., 21_i, ..., 21_I (such as LEDs, for example) of the lighting system 1 are shown, that are indexed by use of an index set I for notational convenience ($1 \leq i \leq I$). The illumination sources 21_1, ..., 21_i, ..., 21_I, particularly, the settings made with regard to the illumination sources 21_1, ..., 21_i, ..., 21_I (like, the dimming levels, power consumption etc., for example) are controlled by the lighting controller 10. In the upper part of FIG. 2, exemplary settings, parameters or values $l_i$, $P_i(l_i)$, $p_i$, $d_i$, $b_i$ concerning the illumination sources 21_1, ..., 21_i, ..., 21_I according to the present embodiment are shown. With l, a vector comprising the dimming levels $l_i$ of the lighting sources 21_1, ..., 21_i, ..., 21_I is denoted, wherein to each i-th lighting source 21_1, ..., 21_i, ..., 21_I a corresponding dimming level $l_i$ ($1 \leq i \leq I$) is assigned. The power consumed by the i-th lighting source 21_1, ..., 21_i, ..., 21_I is a function of the dimming level $l_i$ of the i-th lighting source 21_1, ..., 21_i, ..., 21_I and is denoted by $P_i(l_i)$, wherein each i-th lighting source 21_1, ..., 21_i, ..., 21_I has a power consumption $P_i(l_i)$. The dimming levels $l_i$ take values between 0 and 1 (i.e., $0 \leq l_i \leq 1$). In case of an LED as an i-th lighting source 21_1, ..., 21_i, ..., 21_I, which uses pulse width modulation, the dimming level $l_i$ may be determined, for example, by utilizing the duty cycle of the LED 21_1, ..., 21_i, ..., 21_I.

As outlined above, according to the present embodiment, the system 1 is equipped with different sensors 11, 12, 13. The presence sensor 11 has the vector p as output, wherein the vector p comprises entries $\{p_i, 1 \leq i \leq I\}$ denoting that with regard to an i-th lighting source 21_1, ..., 21_i, ..., 21_I an occupancy value $p_i$ has been measured or determined by the presence sensor 11. The daylight sensor 12 has the vector d as output, wherein the vector d comprises entries $\{d_i, 1 \leq i \leq I\}$ denoting that with regard to an i-th lighting source 21_1, ..., 21_i, ..., 21_I a daylight level (value) $d_i$ has been measured or determined by the daylight sensor 12. The blind controller 13 has the vector b as output, wherein the vector b comprises entries $\{b_i, 1 \leq i \leq I\}$ denoting that with regard to an i-th lighting source 21_1, ..., 21_i, ..., 21_I a blind setting $b_i$ has been made by the blind controller 13.

Figure 3:
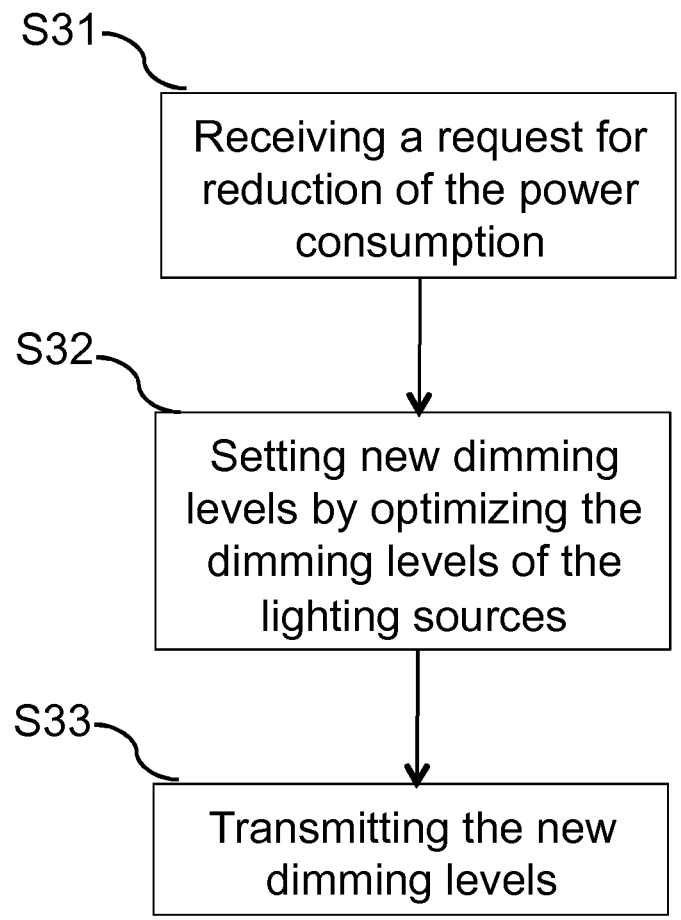
FIG. 3 illustrates steps or actions for optimizing dimming levels of lighting sources according to an embodiment of the present invention.

According to the present embodiment, at each time instant, at which (dynamic) load management (e.g., demand response) is requested, an optimization of the dimming levels $l_i$ is requested. FIG. 3 illustrates steps or actions for optimizing dimming levels i of lighting sources 21_1, ..., 21_i, ..., 21_I according to an embodiment of the present invention. Said steps or actions are performed by the lighting controller 10. In step S31, a request for reduction of the power consumption is received. As indicated above with regard to FIG. 1, the need for dynamic load management may be signaled from an electrical network or from a central building management processor, for example. In this case, the request 15 may be received from the electrical network (for e.g., from the utility meter by wired or wireless means) or from the central building management processor (via the interface 17), for example. The request 15 may comprise a requested or target power consumption value $P_r$. Further, the request 15 may comprise a target period of time, indicating the duration for reducing the power consumption of the lighting sources 21_1, ... 21_i, ..., 21_I. A desired or target spatial illumination $I_D$ can also be provided with the request 15 or may be determined by use of the target power consumption value $P_r$, wherein the desired or target spatial illumination $I_D$ may be determined, for example, by multiplying the requested or target power consumption value $P_r$ with a factor $\beta$, specifying the relation between values of the spatial illumination and of the power consumption: $I_D = \beta \cdot P_r$. The optimization of the dimming levels $l_i$ may be requested S31 for each room of a building separately. In this case, the subsequent setting S32 new dimming levels $l_i$ will be performed with regard to lighting sources 21_1, ..., 21_i, ..., 21_I of the respective room.

In step S32, setting new dimming levels $l_i$ of the lighting sources 21_1, ..., 21_i, ..., 21_I is executed by optimizing or determining the (current) dimming levels $l_i$. To this, an optimization problem is solved in step S32, in which l= $\{l_i, i \in I\}$ is determined such that it minimizes the current power consumption $P_T(l) = \Sigma_{i \in I} P_i(l_i)$ to the requested or target power consumption $P_r$, i.e. such that by use of new dimming levels $l_i$ the system 1 operates the lighting sources 21_1, ..., 21_i, ..., 21_I with the requested or target power consumption $P_r$. Here, the annotation $i \in I$ corresponds to the annotation $1 \leq i \leq I$. For solving the optimization problem, according to the present embodiment, the following two constraints C1, C2 should be met. In line with constraint C1: $0 \leq l_i \leq 1$ for all $i \in I$. In line with constraint C2: $f(E_T(l, d, b, p) I_D) \leq \delta$. Here, $E_T(l, d, b, p)$ denotes the current spatial illumination $E_T$ achieved by the current or given vectors l, d, b, p. Further, $\delta$ denotes a (preset) tolerable contrast threshold value. A particular form for C2 may be found in Eqn 3 in the case considered in Occupancy based illumination control of LED lighting systems, the solution for this form for C2 is found by applying the Simplex method to solve the linear programming problem.

An example of a particular form for C2, wherein only the occupancy sensor is considered (the daylight sensor and the blind controller is excluded) follows:

The total power consumed by the lighting system under the illumination constraints in the occupied and unoccupied regions is sought to be minimized. Here, d* denotes the optimum dimming vector to be solved. d denotes the $N_x N_y \times 1$ dimming vector, given by $$d = [d_1, \ldots, d_{N_x N_y}],$$

where $0 \cdot d_i \cdot 1$ is the dimming level of the ith light source. $d_i = 0$ means that the light source is dimmed off while $d_i = 1$ represents that the light source is at its maximum illumination. Given J known locations $(x_j, y_j)$ of occupants, it is desired to have a uniform illumination level, $L_{max}$, in regions around the occupant locations. Further, $R_O$ denotes the region to be illuminated. · denotes the area of the region $R_O$. The constant $r_O$ may be chosen as per workspace norms and occupant comfort. Thus at any point in $R_O$, the contrast between the total illumination and $L_{max}$, will be lower than a prescribed contrast $C_{th}$. Furthermore, the mean illumination level over $R_O$ is desired to be $L_{max}$. Outside region $R_O$, it is desired that the illumination level be at least $L_{min}$.

$$d^* = \arg \min_d \sum_{i=1}^{N_x N_y} P_i(d_i)$$

s.t.

$$\begin{cases} |C(E_T(x, y, d; h), L_{max})| \leq C_{th}, \\ \forall (x, y) \in R_o \\ E_T(x, y, d; h) \geq L_{min}, \\ \forall (x, y) \notin R_o \\ \frac{1}{\Omega} \int_{(x,y) \in R_o} E_T(x, y, d; h) \partial x \partial y = L_{max} \\ 0 \leq d_i \leq 1, i = 1, \ldots, N_x N_y. \end{cases}$$

Here, $P_i(d_i)$ is the average power consumption of the ith light source at dimming level $d_i$.

$E_T(x, y, d; h)$ is the total illuminance at point (x, y) and distance h resulting by using dimming vector d. Some comments are in order regarding the optimization problem in above. Note that in the region outside $R_O$, an illumination level of at least $L_{min}$ is required, which is different from the requirement of uniform illumination of $L_{max}$ inside $R_O$. This is due to the practical reason that it is not possible to achieve uniform illumination in this region owing to edge effects (e.g., on the boundaries outside $R_O$ and near the walls). Further, a feasible solution is assumed to exists for the optimization problem above. That is, the light source system is designed in the first place such that illumination control can be done as per the optimization problem above.

The solution for this form for C2 is found by applying the Simplex method to solve the linear programming problem.

Thus, in the optimization problem of step S32, the objective function is to reduce the total power consumption of the lighting system 1. The optimization variables are the dimming levels $l_i$, that take values between 0 and 1 (given by constraint C1 of the present embodiment). The other constraint C2 captures the illumination rendering aspect. In a general form, it says that the variation of the spatial illumination $E_T$, achieved when vectors l, d, b, p are given, from the desired spatial Illumination $I_D$, as captured by the function $f$, is less than the tolerable contrast threshold value $\delta$. The constraint C2 can be posed in various ways to capture aspects like occupant visual comfort and precision of illumination rendering.

According to the present embodiment, solutions are sought S32 in such a manner that an optimized or new dimming level vector $l^{opt}$ is determined and, if feasible, the dimming level l* such that $P_T(l^*) \leq P_r$. The power consumption with dimming level vector l* is then $P_T(l^*)$, which thus provides a predictable estimate of power consumption.

According to another embodiment, the solution S32 results in the dimming level vector $l^{opt}$. The power consumption under this setting may still be above the requested power level reduction.

Further, it has to be noted, that according to the present embodiment no data is selected for applying perturbations, i.e., the set of data, to which the perturbations should be applied, is empty. In this way, also an "exact" performing of determining new dimming levels $l_i$ may be performed besides the "relaxed" or approximated determining using a set of data selected for applying perturbations, which is not empty and comprises at least one entry, being arranged as outlined above or specified in more detail below with the next embodiment of the present invention.

According to the present embodiment, in step S33, the new dimming levels $l_i$, particularly, the new dimming level vector $l^{opt}$ or l* or information in an equivalent form are transmitted from the lighting controller 10 to the electrical network or to the central building management processor (via the interface 17).

Figure 4:
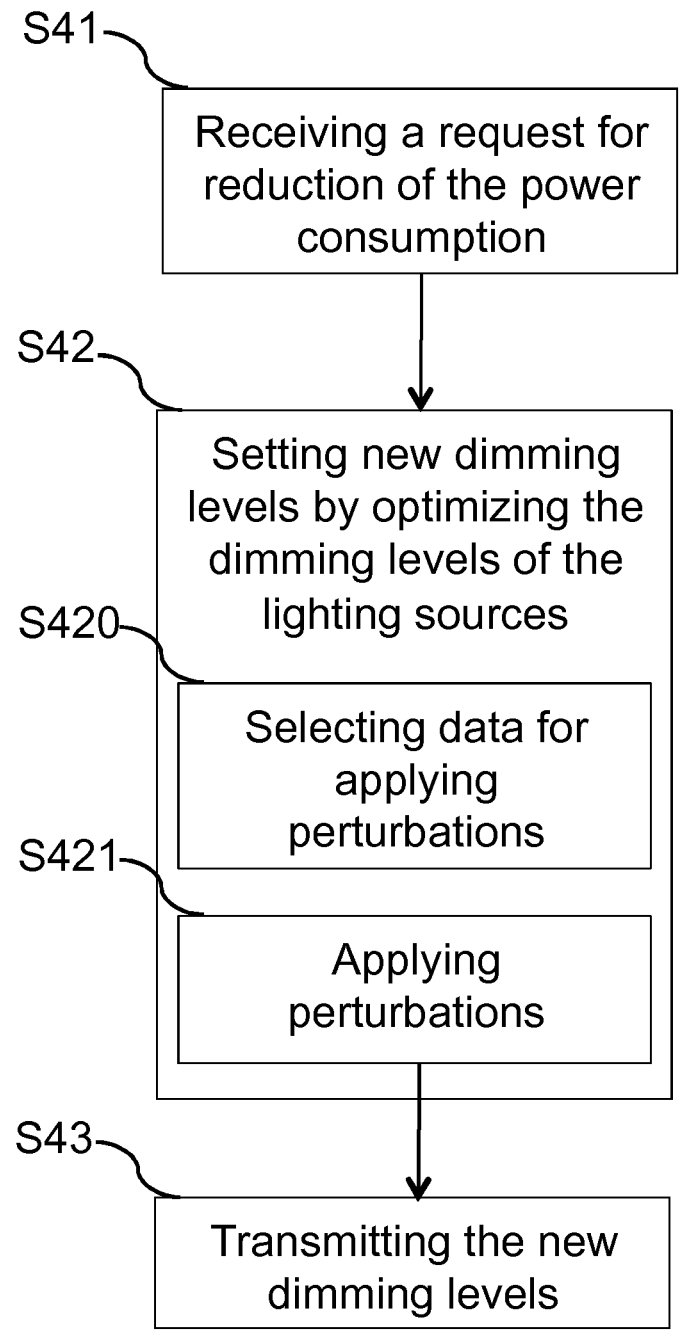
FIG. 4 illustrates steps or actions for optimizing dimming levels of lighting sources according to an embodiment of the present invention.

FIG. 4 illustrates steps or actions for optimizing dimming levels $l_i$ of lighting sources 21_1, ..., 21_i, ..., 21_I according to a further embodiment of the present invention. Also here, said steps are performed by the lighting controller 10. According to the present embodiment, the step S41 of receiving a request for reduction of the power consumption corresponds the above-explained step S31. In step S42, new dimming levels $l_i$ are set by optimizing or determining the (current) dimming levels $l_i$ of the lighting sources 21_1, ..., 21_i, ..., 21_I. According to the present embodiment, in step S42 a perturbed optimization problem is solved, wherein $l=\{l_i, i \in I\}$ is determined such that it minimizes the current power consumption $P_T(l)=\Sigma_{i \in I} P_i(l_i)$ to the requested or target power consumption $P_r$, i.e. such that by use of new dimming levels $l_i$ the system 1 operates the lighting sources 21_1, ..., 21_i, ..., 21_I with the requested or target power consumption $P_r$. To this, the following two constraints C1, C2 should be met. In line with constraint C1, $0 \leq l_i \leq 1$ for all $i \in I$. In line with constraint C2: $f(E_T(l, d+\epsilon_1 \cdot d, b+\epsilon_2 \cdot b, p), I_D - \epsilon_3 \cdot I_D) \leq \delta + \delta_1$. Here, in step S42, perturbations $\epsilon_j$ are applied in a sub step S421. Said perturbations $\epsilon_j$ are vectors/matrices and the operation "." denotes corresponding element-wise multiplications with the respective perturbations $\epsilon_j$. According to the present embodiment, all perturbation $\epsilon_j$, $\delta_1$ values, used or applied in sub step S421, are positive.

Basically, according to the present embodiment, perturbations $\epsilon_j$ are made on the vectors d and b received at the lighting controller 10 from the devices 11, 12 (e.g., in line with the present embodiment, the daylight levels d and the blind settings b are increased a bit (by use of corresponding perturbations $\epsilon_1$, $\epsilon_2$) over the actual value) and/or on the desired spatial illumination $I_D$, which, according to the present embodiment, is decreased by a certain amount $\epsilon_3$, and/or the tolerable limit $\delta$, which according to the present embodiment, is increased by perturbation $\delta_1$. This results in a more relaxed optimization problem, which, in turn, leads to lower new dimming levels $l_i$ of the lighting devices (e.g. LEDs) 21_1, ..., 21_i, ..., 21_I. Here, it has to be noted, that according to the present invention the perturbations may be applied to different data or values, i.e. different sensor or further (control) device data, desired spatial illumination and/or tolerable limit value and their appliance is not limited to the example of the present embodiment only. Thus, for applying S421 the perturbations $\epsilon_j$, $\delta_1$, different data in different combinations with each other may be selected. The selecting may be performed in a separate step, if required. In FIG. 4, the step of selecting the data, to which the perturbations are applied S421, is indicated by S420 and comprises an exemplary selecting of vectors d and b, the desired spatial illumination $I_D$ and the tolerable limit $\delta$. Further, the perturbations $\epsilon_j$, $\delta_1$ may be chosen in a different manner across rooms. I.e., they may be chosen or selected differently across different lighting controllers 10. Furthermore, the perturbations $\epsilon_j$, $\delta_1$ may be chosen so as to satisfy guarantees on illumination rendering. Illumination service guarantees can differ across illumination function type (e.g., different for decorative lighting and general lighting). Illumination service guarantees can further differ according to user preferences based for instance on their visual comfort levels. The perturbations $\epsilon_j$, $\delta_1$ are thus selected in a controlled way so as not to adversely affect occupant visual comfort or the expected illumination rendering beyond acceptable limits. Their selecting should performed such that power reduction is balanced by required amounts and illumination/visual comfort. Further, the perturbations may be selected differently across different lighting controllers.

Further, the perturbations may be applied S421 sequentially and/or incrementally and/or in combination. Moreover, based on a current power consumption $P_T(l)=\Sigma_{i \in I} P_i(l_i)$, which results from already (i.e. previously) applied perturbations, it may be decided, which subsequent perturbations should be applied S421 (i.e. on which data they should be applied S421) and/or which values the subsequent perturbations should have to meet the requested power reduction $P_r$. Thus, according to a further embodiment of the present invention, the step S42 may comprise a step of selecting perturbations (not shown in FIG. 4), which can be performed by use of previously applied perturbations (used in a previous setting of dimming levels performed with regard to a previously executed power consumption reduction). The use of previously applied perturbations may comprise selecting perturbations by considering or use of data, which has been selected for the previous appliance of perturbations, and/or by considering or use of values of the previously applied perturbations.

After solving the more relaxed or perturbed optimization problem according to the present embodiment, in step S43 (like the step S33), the new dimming levels $l_i$, particularly, the new dimming level vector $l^{opt}$ or l* or information in an equivalent form are transmitted from the lighting controller 10 to the electrical network or to the central building management processor (via the interface 17).

In following, two different specific examples or embodiments are discussed in view of the embodiments provided exemplary above.

In the first specific embodiment of the present invention, an occupant is considered at a given location. It is desired that within a radius of 1 m around the occupant location, 500 1x is rendered with a contrast of 30% and 300 1x at all other locations. The blind controller 13 is assumed to be such that it is "half-open". The current dimming levels $l_i$ of the lighting system 1 are determined to provide the desired illumination rendering. Now assume that a demand reduction comes in (see steps S31, S41). Then the lighting controller 10 has the option to apply one or more perturbations $\epsilon_j$, $\delta_1$ sequentially, or in combination, to meet the power reduction request: reduction of 500 1x in occupied regions; reduction of 1 m range; reduction of 300 1x in unoccupied regions; increase of contrast; modification of blind control setting to a higher value (so that higher daylight is assumed spatially). The above perturbations are applied and the perturbed optimization problem is solved to determine the new dimming levels $l_i$.

By use of the second specific embodiment of the present invention, a simple numerical example is presented to illustrate the power savings, that can result from the illumination level setting method according to the present embodiment, with minimal impact on illumination effects. In line with the present embodiment, the following conditions are given. A large office with 160 uniformly spaced LUXEON Rebel LEDs (max illuminance 14.3 1x) on the ceiling and with 10 users in specified parts of the office room is given. A 500 1x/300 1x illumination rendering is set to be the standard setting in occupied/unoccupied areas when some parts of the office room are occupied. Variations about the desired illumination rendering are captured as a normalized 1-1 norm. A visual contrast of 30% is set. When a dynamic demand/demand response comes (see steps S31, S41), an optimization problem is used with perturbations in the desired illumination and a 400 1x/100 1x setting is chosen (i.e. a perturbation of 100 1x is applied on the spatial illumination distribution) by use of the optimization problem (see step S42). In line with the second specific embodiment, a 45% saving in power consumed is achieved upon the optimization of the dimming levels $l_i$ of the 160 LEDs. When aggregated over lighting systems in multiple rooms, these numbers suggest that a lighting system 1 can offer substantial power reductions in a reasonably predictable manner.

Figure 5:
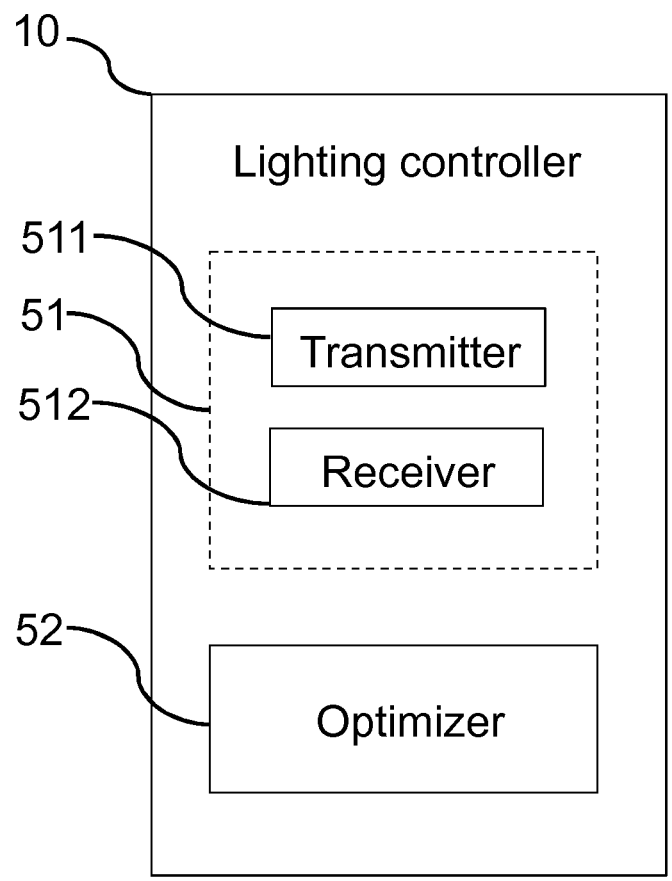
FIG. 5 illustrates arrangement of a lighting controller according to an embodiment of the present invention.

FIG. 5 illustrates arrangement of a lighting controller 10 according to an embodiment of the present invention. According to the present embodiment, the lighting controller 10 comprises a receiver 512, configured to perform the steps S31, S41, for example, and a transmitter 511, configured to perform the steps S33, S43, for example. The receiver 512 and the transmitter 511 may be arranged as separate components in the lighting controller 10 or as one transceiver 51. Here, the present invention allows different appropriate configurations of the lighting controller 10. Further, in line with the present embodiment, the lighting controller 10 comprises an optimizer or processor 52, configured to select new dimming levels $l_i$, as explained exemplary above with regard to steps S32, S42.

Thus, the present invention provides a lighting system control, which is capable of providing dynamic load management (e.g., demand response) functionalities in a smart grid. The illumination dimming levels of the lighting system may be determined based on required levels of power reduction and durations. To this, presence sensing and patterns thereof, distribution of daylight illumination and patterns thereof and/or further values measured or set in the lighting system may be used. The illumination dimming levels of the lighting system may be determined through optimization of dimming levels and, if desired, through limited perturbations of several factors or data relevant for dimming level determining and power consumption reduction, wherein said factors or data may comprise, for example, at least one of following: daylight sensing, blind control, target illumination and/or contrast threshold. The optimization of dimming levels may be done so as to render illumination with dimming settings that reduces the power consumption towards meeting requested power reductions over the required time duration. Selection of perturbation limits may be based on required illumination rendering service guarantees. Further, guaranteed levels of illumination rendering may be provided to users that may be tuned by the users. Moreover, guaranteed levels of illumination rendering may be provided that depend on the type of space (e.g. office, corridor etc.) and lighting requirement (e.g. decorative lighting, functional lighting, general lighting etc.).

The person skilled in the art realizes that the present invention by no means is limited to the embodiments described above. On the contrary, many modifications and variations are possible within the scope of the appended claims. By means of the above-described lighting control, a lighting system can utilize its sensing and control functionalities to offer dynamic load management (e.g. demand response) services in an electrical grid. The methodology of the present invention takes into account specific guarantees on illumination rendering acceptable to different users and also differing illumination requirements in different spaces. Predictable and effective load reductions may be achieved by the lighting control of the present invention.

ITEMIZED LIST OF EMBODIMENTS

1. A device (10) configured to set new dimming levels of a plurality of lighting sources (21_1, . . . , 21_i, . . . , 21_I) by determining (S32, S42) a solution for an optimization problem in response to a request (15) for reduction of power consumption of the plurality of lighting sources (21_1, . . . , 21_i, . . . , 21_I) or predictively for load balancing, where for each lighting source (21_1, . . . , 21_i, . . . , 21_I) of the plurality of lighting sources (21_1, . . . , 21_i, . . . , 21_I) a new dimming level is determined such that power consumption of the plurality of lighting sources (21_1, . . . , 21_i, . . . , 21_I) is reduced by the new dimming levels of the plurality of lighting sources (21_1, . . . , 21_i, . . . , 21_I), wherein the device (10) is configured to determine (S32, S42) the solution for the optimization problem by use of perturbing values and to calculate the perturbing values by applying (S421) perturbations to data, which has been determined, set and/or provided with regard to the plurality of lighting sources (21_1, . . . , 21_i, . . . , 21_I) and which has been selected for the applying (S421) the perturbations.

2. The device (10) according to item 1, wherein current dimming levels of the plurality of lighting sources (21_1, . . . , 21_i, . . . , 21_I) are variables of the optimization problem, each lighting source (21_1, . . . , 21_i, . . . , 21_I) of the plurality of lighting sources (21_1, . . . , 21_i, . . . , 21_I) having one current dimming level.

3. The device (10) according to any one of the preceding items, wherein the device (10) is configured to determine (S32, S42) the solution for the optimization problem such that a variation of a current spatial illumination from a target spatial illumination is less than a tolerable contrast threshold value, wherein the current spatial illumination is achieved by current dimming levels of the plurality of lighting sources (21_1, . . . , 21_i, . . . , 21_I).

4. The device (10) according to any one of the preceding items, wherein the device (10) is configured to determine for each lighting source (21_1, . . . , 21_i, . . . , 21_I) of the plurality of lighting sources (21_1, . . . , 21_i, . . . , 21_I) the new dimming level by use of at least one information, the at least one information being determined and/or set with regard to the respective lighting source (21_1, . . . , 21_i, . . . , 21_I).

5. The device (10) according to item 3 or 4, wherein the current spatial illumination, which is achieved by the current dimming levels of the plurality of lighting sources (21_1, . . . , 21_i, . . . , 21_I), is further achieved by the at least one information determined and/or set with regard to each lighting source (21_1, . . . , 21_i, . . . , 21_I) of the plurality of lighting sources (21_1, . . . , 21_i, . . . , 21_I).

6. The device (10) according to any one of the preceding items, wherein the data, to which the perturbations are applied (S421) comprises at least one of the following: at least one of the at least one information determined and/or set with regard to each lighting source (21_1, . . . , 21_i, . . . , 21_I) of the plurality of lighting sources (21_1, . . . , 21_i, . . . , 21_I); the target spatial illumination; the tolerable contrast threshold value.

7. The device (10) according to any one of items 4 to 6, wherein the at least one information comprises sensor data and/or data determined or set by a further device (13) with regard to lighting sources (21_1, . . . , 21_i, . . . , 21_I).

8. The device (10) according to any one of items 4 to 7, wherein the at least one information comprises at least one of the following: a value indicating degree of occupancy determined by a presence sensor (11); a value indicating a daylight level determined by a daylight sensor (12); a blind setting of a blind controller (13).

9. The device (10) according to any one of the preceding items, wherein, while determining (S32, S42) the solution for the optimization problem, the device (10) is configured to reduce the power consumption of the plurality of lighting sources (21_1, . . . , 21_i, . . . , 21_I) up to a target power consumption.

10. The device (10) according to any one of the preceding items, wherein the device (10) is configured to reduce the power consumption for a period of time.

11. The device (10) according to items 9 and/or 10, wherein the request (15) comprises at least one of the following: the target power consumption; the period of time.

12. The device (10) according to any one of the preceding items, wherein the device (10) is configured to:
apply (S421) the perturbations sequentially, incrementally and/or in combination;
apply (S421) the perturbations based on previously applied perturbations, which have been applied with regard to a previous power consumption reduction;
apply (S421) the perturbations based on the previously applied perturbations by use of previous data, which has been selected for appliance of the previously applied perturbations; and/or
apply (S421) the perturbations based on previously applied perturbations by use of values of the previously applied perturbations.

13. A method for setting new dimming levels of a plurality of lighting sources (21_1, . . . , 21_i, . . . , 21_I) by determining (S32, S42) a solution for an optimization problem in response to a request (15) for reduction of power consumption of the plurality of lighting sources (21_1, . . . , 21_i, . . . , 21_I) or predictively for load balancing, where for each lighting source (21_1, . . . , 21_i, . . . , 21_I) of the plurality of lighting sources (21_1, . . . , 21_i, . . . , 21_I) a new dimming level is determined such that power consumption of the plurality of lighting sources (21_1, . . . , 21_i, . . . , 21_I) is reduced by the new dimming levels of the plurality of lighting sources (21_1, . . . , 21_i, . . . , 21_I), wherein the solution for the optimization problem is determined (S32, S42) by use of perturbing values and wherein the perturbing values are calculated by applying (S421) perturbations to data, which has been determined, set and/or provided with regard to the plurality of lighting sources and which has been selected for the applying (S421) the perturbations.

14. The method according to item 13, wherein the method is performed by a device (10), configured to control power consumption of the plurality of lighting sources (21_1, . . . , 21_i, . . . , 21_I).

15. A system (1) comprising a device (10) according to any one of items 1 to 12.

The invention claimed is:

1. A lighting controller configured to set dimming levels of a plurality of light sources arranged to provide a spatial illumination at a workspace, said lighting controller comprising a processor arranged to determine, based on information about a target power level or target power reduction, a dimming level for each of said plurality of light sources such as to reduce power consumption from the plurality of light sources towards the target power level or target power reduction and such as to provide a target spatial illumination at said workspace, wherein said processor is further arranged to determine said dimming levels for each of said plurality of light sources by:
receiving, from a daylight light sensor or a blind controller, data indicative of an ambient illumination sensed by the daylight sensor or data indicative of a blind setting;
at least temporarily storing the data indicative of ambient illumination or data indicative of the blind setting;
applying a perturbation to the stored data to generate artificially perturbed data that deviates from the stored data by a parameter, $\epsilon$; and
determining said dimming levels for each of said plurality of light sources based on the artificially perturbed data.

2. The lighting controller according to claim 1, further comprising a transmitter arranged to transmit the determined dimming level to each of said plurality of light sources.

3. The lighting controller according to claim 1, further comprising a receiver arranged to receive at least one of peripheral data from the daylight sensor regarding ambient illumination at said workspace, peripheral data from the blind controller regarding said blind setting, and peripheral data regarding a degree of occupancy in said workspace from a presence sensor.

4. The lighting controller according to claim 1, wherein the target spatial illumination in said workspace is determined by a service policy with a guarantee on illumination rendering and limit thereof.

5. The lighting controller according to claim 4, wherein said service policy with a guarantee on illumination rendering comprises at least one of:
an illumination level for an occupied region of said workspace,
an illumination level for an unoccupied region of said workspace and
a range defining said occupied region around an occupant location in said workspace.

6. The lighting controller according to claim 4, wherein said service policy with a guarantee on illumination rendering is tunable.

7. The lighting controller according to claim 1, wherein said processor is arranged to determine the dimming level of the light sources considering peripheral data regarding a degree of occupancy in said workspace.

8. The lighting controller according to claim 1, wherein said information about a power level or a power reduction is a request including a period of time, said processor being further arranged to maintain the determined dimming levels for each of said plurality of light sources during said period of time.

9. The lighting controller according to claim 1, wherein said processor is further arranged to determine a dimming level using current dimming levels of each of said plurality of light sources.

10. The lighting controller according to claim 1, wherein said processor is further arranged to determine a dimming level for each of said plurality of light sources by selecting data from the data indicative of ambient illumination and the data indicative of the blind setting sequentially and applying perturbation to the selected data in increasing step.

11. The lighting controller according to claim 1, wherein said perturbation is a positive value such that the perturbation direction of a value being perturbed is fixed.

12. The lighting controller according to claim 11, wherein said daylight sensor and/or a presence sensor is arranged to provide data at various levels of detail relative to said workspace.

13. A lighting system comprising:
at least one light source,
a lighting controller according to claim 12.

14. The lighting system according to claim 13, further comprising at least one of: a daylight sensor; a presence sensor; and a blind controller.

15. A method for setting dimming levels of a plurality of light sources arranged to, at least partly, provide a spatial illumination at a workspace, the method comprising the step of:
- receiving, from a daylight light sensor or a blind controller, data indicative of an ambient illumination sensed by the daylight light sensor or data indicative of a blind setting;
- at least temporarily storing the data indicative of ambient illumination or data indicative of the blind setting;
- applying a perturbation to the stored data to generate artificially perturbed data that deviates from the stored data by a parameter, $\epsilon$; and
- determining, based on information about a target power level or target power reduction, as well as based on the artificially perturbed data, a dimming level for each of said plurality of light sources such as to reduce power consumption from the plurality of light sources towards the target power level or target power reduction and such as to provide a target spatial illumination at said workspace.

\* \* \* \* \*